UNITED STATES PATENT OFFICE.

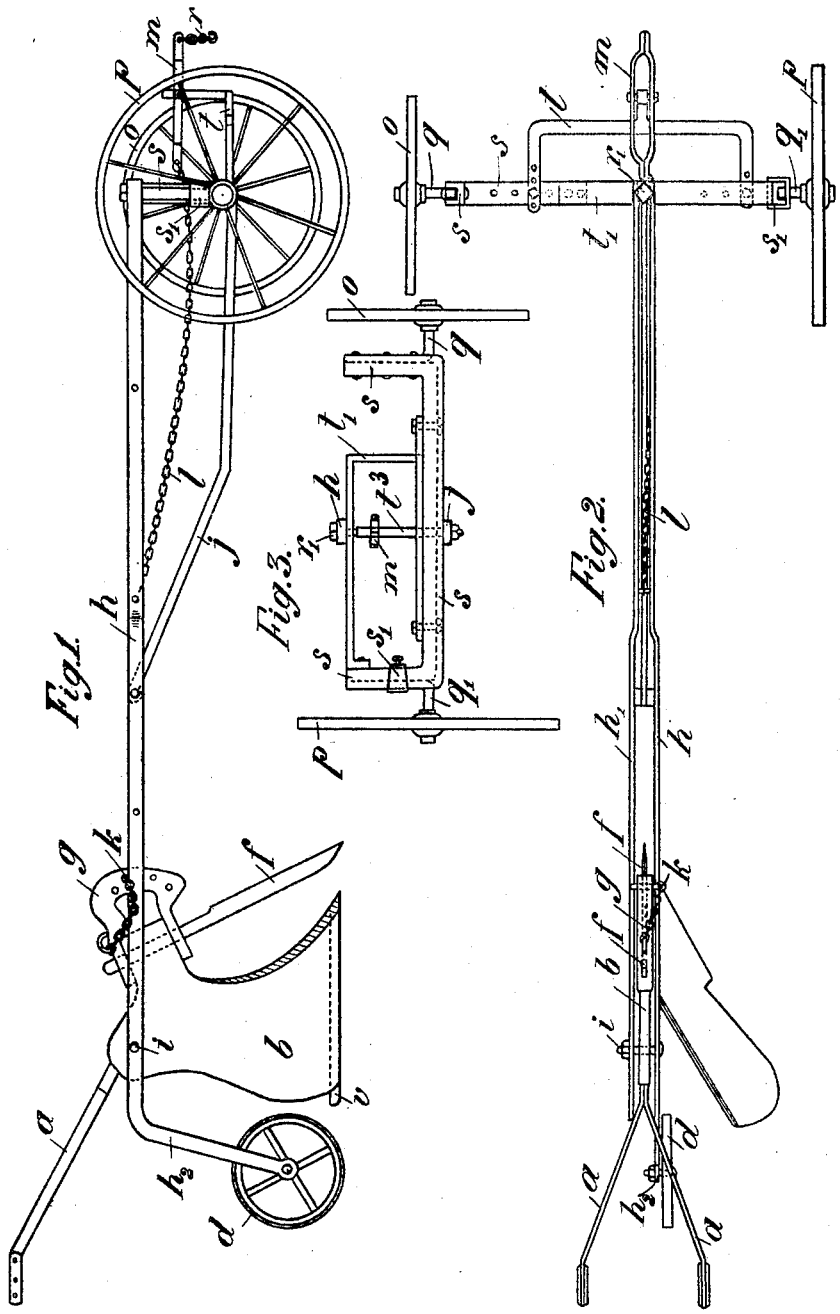

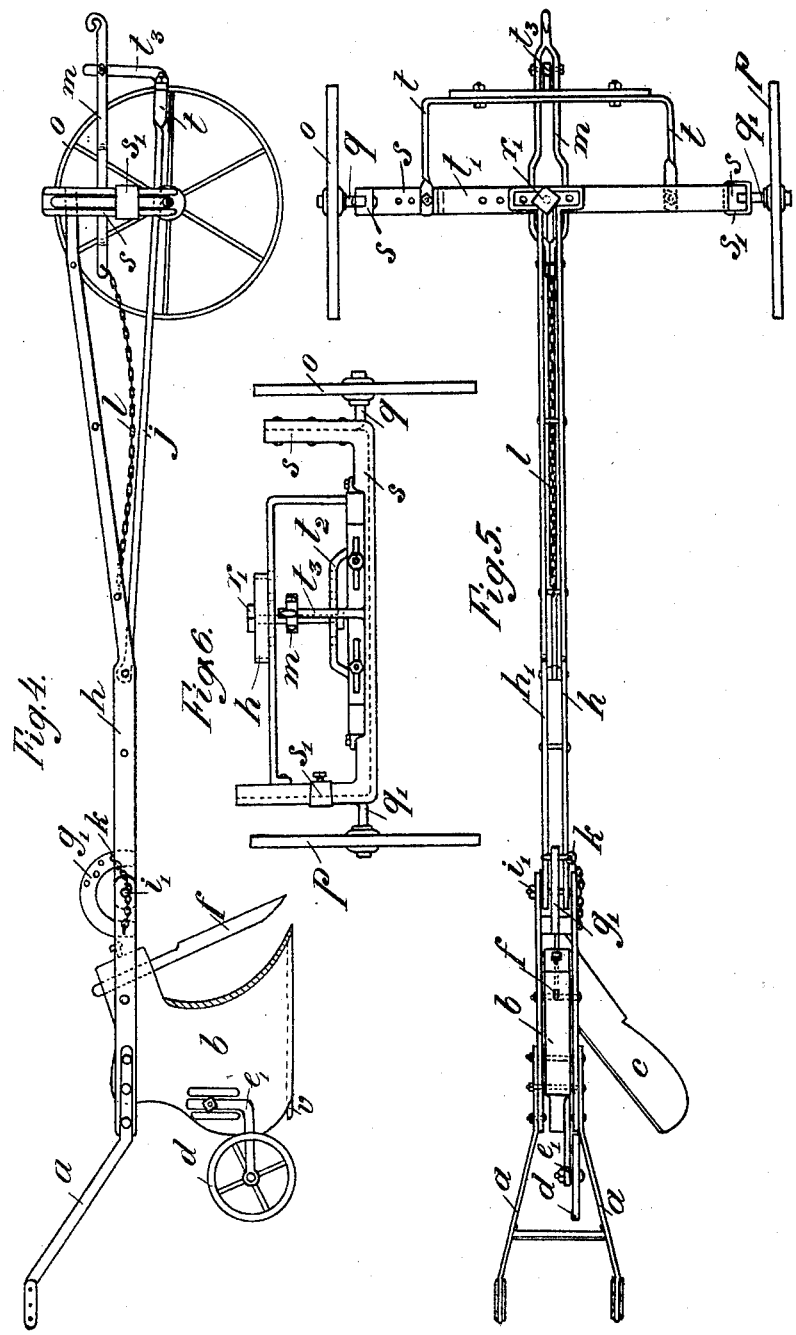

STEFAN BEHRINGER, OF BUDAPEST, AUSTRIA-HUNGARY.

PLOW.

SPECIFICATION forming part of Letters Patent No. 681,677, dated September 3, 1901.

Application filed February 17, 1900. Serial No. 5,656. (No model.)

*To all whom it may concern:*

Be it known that I, STEFAN BEHRINGER, a subject of the Emperor of Austria-Hungary, residing at Budapest, Austria-Hungary, have invented certain new and useful Improvements in Plows, of which the following is a description.

The present invention relates to plows; and it consists of the details of construction hereinafter set forth, and particularly pointed out in the claims.

In order to render the present specification easily intelligible, reference is had to the accompanying drawings, in which similar letters of reference denote similar parts throughout the several views.

Figure 1 is a side elevation with the moldboard removed; Fig. 2, a plan, and Fig. 3 a front elevation, with the rear parts removed, of one form of plow embodying the invention; and Figs. 4, 5, and 6 are similar views, respectively, of a modification, the moldboard being again omitted from Figs. 4 and 6.

Referring to Figs. 1 to 3, the plow $b$, having the moldboard $c$, is pivotally mounted at $i$ between the two longitudinal members $h$ $h'$ composing the beam, and the said plow may be vertically adjusted on its pivot by depressing or raising the handles $a$ $a$, rigidly attached thereto and retaining the plow in the desired position by inserting the cross-pin $k$ into one or other of the orifices of a segment $g$, fixed to the top part of the plow, the said pin then resting on the beam and preventing a downward movement of the plow, but allowing the same to be freely raised when the handles $a$ are depressed to disengage the shear from the furrow. Behind the shear at the rear end of the plow the beam $h$ $h'$ is turned downwardly, and at its lower end is mounted the wheel $d$. By depressing the handles $a$, therefore, the plow will be raised and the weight of the rear part of the same thrown onto the said wheel $d$. The colter $f$ is mounted at the front end of the plow and moves with the same in the vertical plane, as will be readily understood. The front ends of the members $h$ $h'$ of the composite beam are supported on the bar $t'$, being attached thereto by means of a bolt $r'$, extending vertically through the parts and being laterally adjustable in a series of orifices in the said bar $t'$ and the cross-bar or frame $s$, on which the front wheels of the plow are mounted. The bar $s$ is of U-shaped cross-section and serves to support the axles $q$ $q'$ for the wheels $p$ and $o$, the axle $q'$ of the former being vertically adjustable by means of a clamping-ring $s'$, which clamps the upturned arm of the said axle between the flanges of the said part $s$. The pivot or axle $q$ of the wheel $o$ is fixed. Thus it will be seen that when the bolt $r'$ is adjusted laterally the width of the furrow produced will be varied, and at the same time the axle of the wheel $p$ may also be adjusted vertically, if desired or necessary. A bow-shaped bar $t$, carrying a central upwardly-turned arm $t^3$, is attached to the part $s$ and laterally adjustable thereon by means of a series of orifices, to any one pair of which it may be bolted, and to this upwardly-extending arm $t^3$ is adjustably pivoted the bar $m$, connected by a chain $l$ to the beam $h$ $h'$, Fig. 1. Thus it will be seen that while the plow is vertically adjustable and movable on a pivot the beam is also laterally adjustable in the horizontal plane.

In the modification shown in Figs. 4, 5, and 6 the plow is rigidly attached to the rear part of the beam, which latter is made in two parts, the rear part being pivotally attached to the front part, as at $i'$. The wheel $d$ is in this case adjustably mounted on the land side and the rear part of the beam is adjustable to any required position as regards the front part by means of the segment $g'$ and a pin $k$, adapted to be inserted therethrough. The front bolt $r'$ is not passed through orifices of the bar $s$, but through similar orifices formed in a saddle-bar $t^2$, Fig. 6, which is mounted on $s$ and receives the lower bolt end in order to prevent weakening the frame $s$ by boring holes through the same. The bow $t$ is also made in two parts, the front upwardly-extending arm $t^3$ being adjustable on the part $t$, as will be readily understood from Fig. 6. The draw-arm $m$ is adjustable thereon and is connected by a chain $l$ to the beam $h$ $h'$.

In both modifications a stay-bar $j$ extends from between the members $h$ $h'$ of the beam and is pivotally attached to the lower part of the bolt $r'$ to prevent the plow from swerving.

I claim as my invention—

1. A plow having its beam composed of two longitudinal members between which the plow is supported pivotally a segment having a series of holes and a cross-pin to engage therein and when in position rest on the top of the composite beam and handles to operate the said plow, a cross-bar at the front end of the beam and means for adjustably attaching the front end of said beam to the cross-bar in a lateral direction, wheels of different diameter mounted on the said beam and means for adjusting one of the said wheel-axles vertically substantially as described.

2. A plow having its beam composed of two longitudinal members, divided intermediate their ends, the two parts of the beam thus formed being hinged together, and means for adjusting the angle at which the said parts are fixed one to the other, a plow rigidly mounted in the rear end of the beam and having handles as specified, a rear wheel vertically adjustable on the land side of the plow, a front cross-bar having two wheels of different diameter and means for adjusting one of the same vertically and means for adjusting the front end of the composite beam laterally on the said cross-bar in the manner and for the purpose substantially as described.

In witness whereof I have hereunto set my hand in presence of two witnesses.

STEFAN BEHRINGER.

Witnesses:
FRANK DYER CHESTER,
RAYMOND WILLEY.